US011914329B2

(12) United States Patent
Zbylut

(10) Patent No.: US 11,914,329 B2
(45) Date of Patent: Feb. 27, 2024

(54) PULL-OUT PIECE INDEXING DEVICE

(71) Applicant: ROLEX SA, Geneva (CH)

(72) Inventor: Ludovic Zbylut, Seynod (FR)

(73) Assignee: ROLEX SA, Geneva (CH)

( * ) Notice: Subject to any disclaimer, the term of this patent is extended or adjusted under 35 U.S.C. 154(b) by 177 days.

(21) Appl. No.: 17/380,140

(22) Filed: Jul. 20, 2021

(65) Prior Publication Data

US 2022/0050420 A1 Feb. 17, 2022

(30) Foreign Application Priority Data

Aug. 14, 2020 (EP) .................................... 20191172

(51) Int. Cl.
*G04B 27/04* (2006.01)

(52) U.S. Cl.
CPC .................................... *G04B 27/04* (2013.01)

(58) Field of Classification Search
CPC .... G04B 27/04; G04B 27/045; G04B 27/004; G04B 37/064; G04B 19/25; G04B 27/02
See application file for complete search history.

(56) References Cited

U.S. PATENT DOCUMENTS 4,112,673 A 9/1978 Gilomen
4,469,448 A 9/1984 Muller
9,170,563 B2 10/2015 Rudaz et al.
9,405,274 B2 * 8/2016 Cattaneo .............. G04B 27/023
9,841,734 B2 * 12/2017 Merino .................. G04C 11/06
10,768,576 B2 * 9/2020 Bonvin .................. G04B 27/02
11,340,558 B2 * 5/2022 McDonnell .......... G04B 27/045
2014/0177397 A1 6/2014 Rudaz et al.
2018/0231938 A1 8/2018 Nakamura et al.

FOREIGN PATENT DOCUMENTS

CH 599594 B5 5/1978
CH 640686 A 1/1984
CH 713426 A2 8/2018
FR 2344876 A1 10/1977
WO 2012175595 A1 12/2012

OTHER PUBLICATIONS

European Search Report and Written Opinion dated Dec. 10, 2020 in priority application No. EP20191172.4; with English machine translation (total 15 pages).

* cited by examiner

*Primary Examiner* — Edwin A. Leon
(74) *Attorney, Agent, or Firm* — Seckel IP, PLLC

(57) ABSTRACT

Indexing device (100) for a pull-out piece (10) for a timepiece,
including an indexing member (4),
and an indexing element (3) which has at least two sets of flanks (31*a*, 31*b*, 31*c*; 32*a*, 32*b*) for defining indexing positions of pull-out piece (10) and which is mounted on the indexing member (4), the indexing member (4) and the indexing element (3) being arranged or configured so as to define at least two positions, in particular at least two fixing positions, of the indexing element (3) on the indexing member (4).

21 Claims, 14 Drawing Sheets

PULL-OUT PIECE INDEXING DEVICE

This application claims priority of European patent application No. EP20191172.4 filed Aug. 14, 2020, the content of which is hereby incorporated by reference herein in its entirety.

The invention relates to a pull-out piece indexing device. The invention also relates to a pull-out piece comprising such a device. The invention also relates to a mechanism comprising such a device or such a pull-out piece. The invention also relates to a movement comprising such a mechanism, such a device or such a pull-out piece. The invention also relates to a timepiece comprising such a movement, such a mechanism, such a device or such a pull-out piece. The invention further relates to a method for assembling such a timepiece, such a movement, such a mechanism, such a device or such a pull-out piece.

The patent application CH640686 discloses a mechanism comprising a control rod which is capable of being positioned in two axial positions. To this end, a beak formed at one end of a pull-out piece spring cooperates with a pin which is fixedly joined to a pull-out piece. More specifically, a first flank of the beak of the pull-out piece spring is in abutment against the pull-out piece pin in order to define a first axial rod position, whilst a second flank of the beak is capable of moving into abutment against the same pull-out piece pin under the traction effect of the rod so as to define a second axial rod position. In this mechanism, the pull-out piece spring is integral with a mechanism rocker and the beak is integral with the pull-out piece spring.

The patent application WO2012175595 discloses a mechanism comprising a control rod which is capable of being positioned in three axial positions. To this end, a beak formed at one end of a pull-out piece spring cooperates with a pin of a spring. The beak has in this instance the specific feature of comprising a cavity which is interposed between two beak flanks which define the extreme positions of the rod in order to define an intermediate rod position. Like the pull-out piece spring of the mechanism of the document CH640686, the beak is also integral with the pull-out piece spring.

The patent application CH713526 discloses a mechanism comprising an alternative pull-out piece device. In a first embodiment of the pull-out piece device, the pull-out piece spring is in the form of an integral component. It comprises a leaf spring and a beak which is rotatably pivoted against a toothed flank of a pull-out piece under the action of the leaf spring. In alternative embodiments of the pull-out piece device, the beak is in the form of an integral component which is articulated to a frame of a movement which is interposed between a pull-out piece spring and a pull-out piece.

Finally, document CH599594 relates to a mechanism comprising a control rod which is capable of having two or three axial positions depending on the configuration of a pull-out piece device which is formed by a pull-out piece spring comprising a beak and a pull-out piece comprising a pin. In a first configuration of the beak of the pull-out piece spring with respect to the pull-out piece pin, the rear face of the beak, formed by two different flanks, is in abutment against the pull-out piece pin so that the pull-out piece device enables two axial positions to be defined for the control rod. In a second configuration of the pull-out piece beak with regard to the pull-out piece pin, the front face of the beak, formed by a first flank, a cavity and a second flank is in abutment against the pull-out piece pin so that the pull-out piece device enables three axial positions to be defined for the control rod. The beak is in this instance integral with the pull-out piece spring. Such a mechanism has the advantage of rationalizing the number of components in the definition of a mechanism with two or three positions. Nonetheless, the pull-out piece spring is pretensioned in two different manners depending on the configuration of the beak of the pull-out piece spring against the pull-out piece pin so that the forces produced on the rod may differ. Furthermore, it is possible for a watchmaker to be able to make an assembly error during the assembly of the movement in which the mechanism is involved or during a restoration operation.

An object of the invention is to provide a pull-out piece indexing device which enables the devices known from the prior art to be improved. In particular, the invention proposes a simple and reliable pull-out piece indexing device which enables different indexing configurations to be defined.

A device according to the invention is defined by point 1 below.

1. A pull-out piece indexing device for a timepiece or for a clock movement, in particular a lever device for a pull-out piece or lever/spring device for a pull-out piece or pull-out piece device, comprising:
 an indexing member, and
 an indexing element which comprises at least two sets of flanks for defining indexing positions of a pull-out piece and which is mounted on the indexing member,
 the indexing member and the indexing element being arranged or configured so as to define at least two positions, in particular at least two fixing positions, of the indexing element on the indexing member.

Different embodiments of the device are defined by points 2 to 6 below.

2. The indexing device as defined in the preceding point, wherein the indexing member is:
 the member of a lever device, in particular the member of a lever/spring device, in particular the member of a lever/spring device in the form of a loop, or
 the member of a pull-out piece device.
3. The indexing device as defined in either of the preceding points, wherein the indexing device comprises a return element which returns the indexing element into a configuration for cooperation with a pull-out piece or with a lever.
4. The indexing device as defined in one of the preceding points, wherein the indexing element is mounted so as to be able to be displaced on the indexing member, in particular mounted so as to be able to be displaced in rotation on the indexing member about an axis, the indexing device comprising positioning elements, such as pins which cooperate with holes, in order to position, in particular fix, the indexing element in a position selected from at least two positions relative to the indexing member.
5. The indexing device as defined in one of the preceding points, wherein a first position of the indexing element on the indexing member enables two pull-out piece positions to be defined relative to a frame and wherein a second position of the indexing element on the indexing member enables three pull-out piece positions to be defined relative to the frame.
6. The indexing device as defined in one of the preceding points, wherein a first indexed pull-out piece position defines a configuration for winding a clock movement, a second indexed pull-out piece position defines a configuration for correcting a time derivative function of a clock movement and a third indexed pull-out piece position defines a time setting configuration of a clock movement.

A mechanism according to the invention is defined by point 7 below.

7. A clock mechanism comprising an indexing device as defined in one of the preceding points and a frame.

Various embodiments of the mechanism are defined by points 8 and 9 below.

8. The clock mechanism as defined in the preceding point, wherein the indexing element is delimited by the indexing member, on the one hand, and by the frame, on the other hand.
9. The clock mechanism as defined in point 7, wherein the indexing element is driven in the indexing member.

A movement according to the invention is defined by point 10 below.

10. A clock movement, wherein it comprises a clock mechanism as defined in one of points 7 to 9 or a pull-out piece indexing device as defined in one of points 1 to 6.

A timepiece according to the invention is defined by point 11 below.

11. A timepiece, in particular a wristwatch, comprising a movement as defined in the preceding point or a clock mechanism as defined in one of points 7 to 9 or a pull-out piece indexing device as defined in one of points 1 to 6.

An assembly method according to the invention is defined by point 12 below.

12. A method for assembling a pull-out piece indexing device as defined in one of points 1 to 6 or a mechanism as defined in one of points 7 to 9 or a movement as defined in point 10 or a timepiece as defined in point 11, wherein it comprises the following steps:
    - a step of providing the indexing member,
    - a step of providing the indexing element,
    - a step of mounting the indexing element on the indexing member:
        - in a first position or
        - in a second position.

The appended drawings illustrate by way of example two embodiments of a timepiece.

Figure 1:
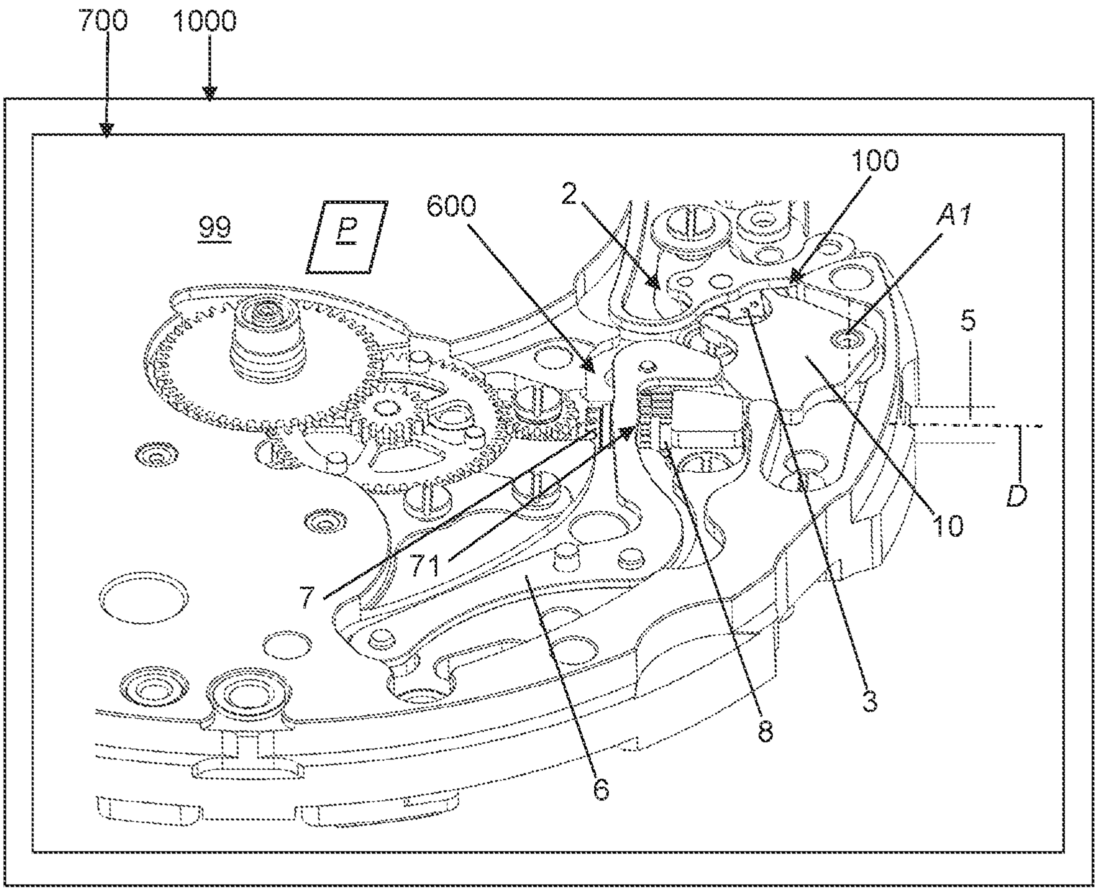
FIG. 1 is a perspective view of a first embodiment of a timepiece.
Figure 2:
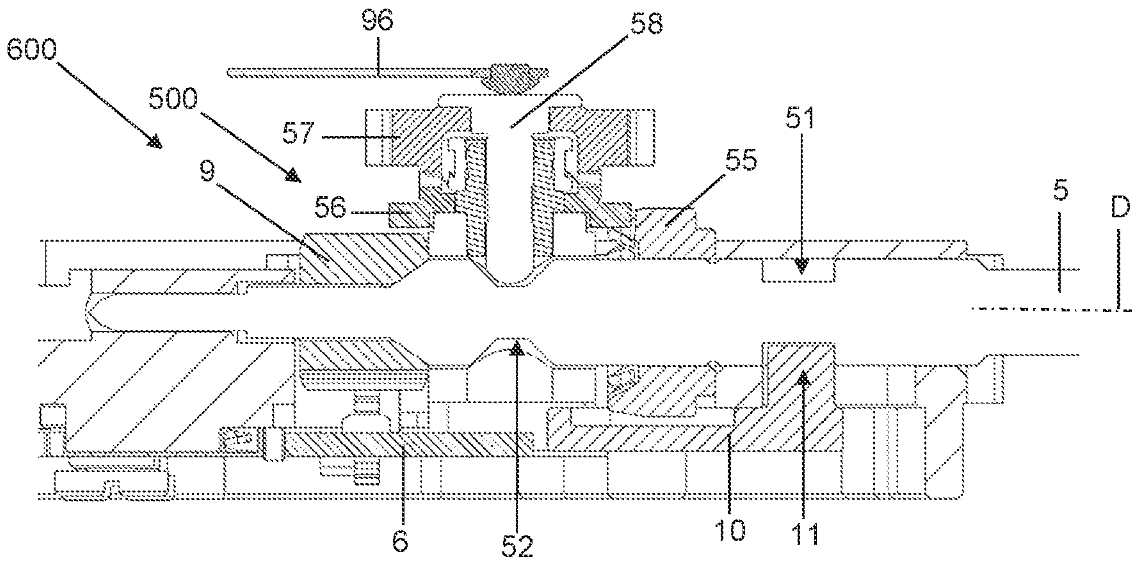
FIG. 2 is a sectioned view along the axis of the rod of a portion of the movement of the first embodiment of the timepiece.
Figure 3:
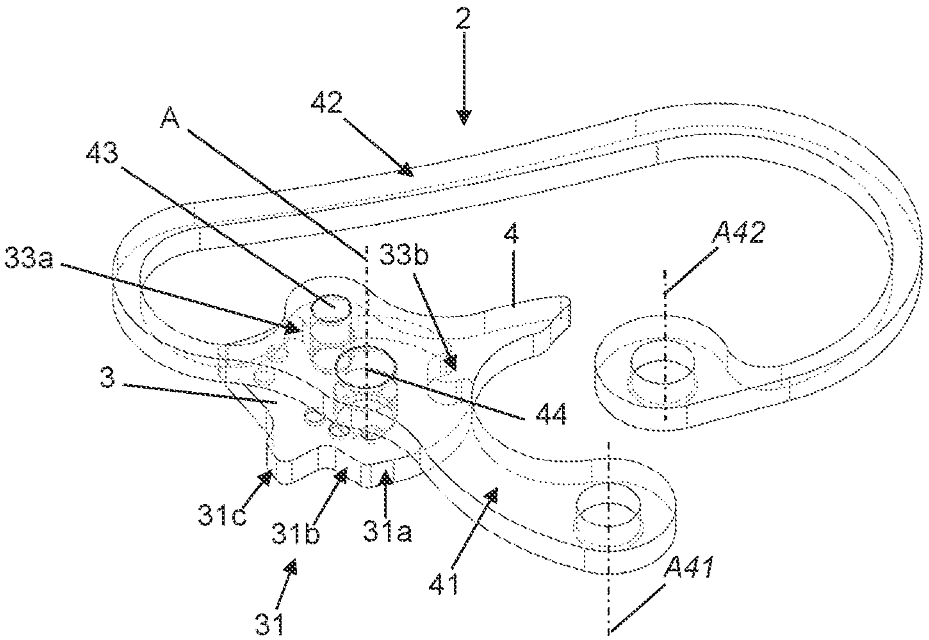
FIG. 3 is a perspective view of a pull-out piece indexing lever/spring device in a first configuration.
Figure 4:
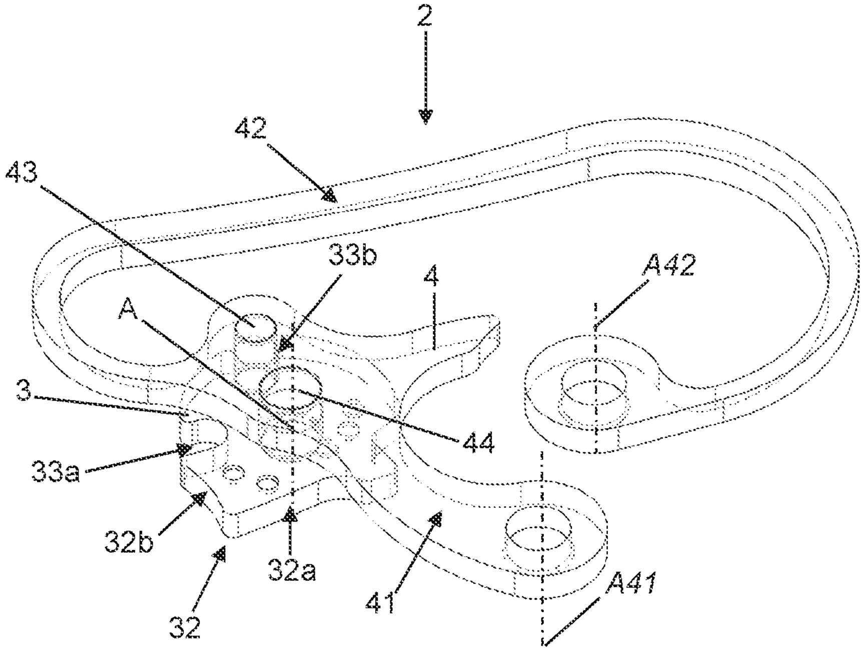
FIG. 4 is a perspective view of a pull-out piece indexing lever/spring device in a second configuration.

A first embodiment of a timepiece 1000 is described below with reference to FIGS. 1 to 9.

The timepiece 1000 is, for example, a watch, in particular a wristwatch.

The timepiece 1000 comprises a watch movement 700 which is intended to be mounted in a timepiece case in order to protect it from the external environment.

The watch movement 700 may be an electronic movement or a mechanical movement, in particular an automatic movement.

The watch movement 700 comprises a watch mechanism 600. In particular, the watch mechanism may be a mechanism which uses a pull-out piece device. The watch mechanism comprises a pull-out piece indexing device 100 and a frame 99 which comprises a movement-blank. The term "indexing of a pull-out piece" is intended to be understood to refer to the definition of different stable positions of the pull-out piece. These stable positions are separated by a continuum of unstable intermediate positions. The user moves, via a mechanical action, in particular a mechanical action on a rod, the pull-out piece from one stable position to another, via a continuum of unstable intermediate positions. Between two stable positions or two indexed positions or two indexing positions, the pull-out piece moves transiently via a continuum of unstable intermediate positions.

The indexing device 100 may in particular comprise a lever device for a pull-out piece or a pull-out piece lever/spring device. In the first embodiment, the indexing device comprises a lever/spring device 2 for a pull-out piece 10.

The pull-out piece 10 is engaged, in particular via one of the ends thereof, in a groove of a first control rod 5. The pull-out piece, in particular via another end, controls a rocker 6 which is engaged in a groove of a sliding pinion 7. The pull-out piece 10 thus enables the position of the sliding pinion to be controlled, at least indirectly. The position of the pull-out piece is indexed by means of an indexing device provided for this purpose.

The pull-out piece 10 is pivoted on the frame 99 along an axis A1. The mechanism 600 also comprises a spring 97 which presses the pull-out piece 10 against the frame, in particular against a movement-blank 99 of the mechanism 600.

The control rod 5 is part of the mechanism 600. The control rod 5 can be moved in translation in a plane P perpendicular or substantially perpendicular to the pull-out piece axis A1, in a direction D. This rod 5 conventionally cooperates with the pull-out piece 10 by means of a pull-out piece pin 11 which is engaged in a groove 51 of the rod 5. In this manner, a translation movement of the rod 5 in the plane P, in the direction D, brings about a rotation movement of the pull-out piece 10 about the axis A1.

The mechanism 600 also comprises a pull-out piece lever/spring device 2. The pull-out piece 10 is also provided to cooperate with the lever/spring device 2 in order to constitute the indexing device 100 of the pull-out piece so that it can define axial positions of the rod 5. In other words, the indexing device also comprises the pull-out piece.

The term "axial position" of the rod 5 or sliding pinion 7 is intended to be understood to refer to a specific position, along the axis D, of the rod 5 or sliding pinion 7 with respect to the movement 700, following a movement of the rod 5 in the direction D in the plane P.

The pull-out piece 10 is also provided to cooperate with the mechanism rocker 6 pivoted about an axis A6 and elastically returned by a spring 98 in order to control the axial position of the sliding pinion 7. The sliding pinion is, for example, arranged on a second rod 8. The second rod 8 is, for example, parallel or substantially parallel with the first rod 5. To this end, the rocker 6 is engaged in a groove 71 of the pinion 7. This pinion 7 also comprises first and second tooth arrangements 72, 73 which are capable of engaging with a specific control chain of the mechanism 600 in accordance with the axial position of the first rod 5.

The kinematics of the sliding pinion 7 is comparable with that of the sliding pinion of the mechanism described in the patent application WO2012175595:

in a first axial position P1 of the first rod 5 and/or the sliding pinion 7, the tooth arrangements 72, 73 are out of range of the wheels which are involved in the various control chains of the mechanism.

In a potential intermediate position P2 of the first rod 5 and/or sliding pinion 7, the edge tooth arrangement 72 of the sliding pinion 7 is in engagement with a tooth arrangement of a wheel 20 of a first control chain 200 of a time indication or time derivative, in particular a calendar indication such as a date indication.

In a third position P3 of the first rod 5 and/or sliding pinion 7, the front tooth arrangement 73 of the sliding pinion 7 is in engagement with a tooth arrangement of a pinion 30 of a second control chain 300 of a time indication and/or time derivative, in particular for setting the time of the movement 700.

Furthermore, the sliding pinion 7 is in this instance capable of being rotatably driven under the rotation action of the first rod 5 via a pinion 9 which is mounted square on the first rod 5 which is in engagement with the edge tooth arrangement 72 of the sliding pinion 7. In this manner, the sliding pinon 7 is connected kinematically to the first rod 5, whether in translation in the direction S via the pull-out piece 10, the rocker 6 and the return spring 98 thereof, or in rotation via the pinion 9.

The mechanism 600 also comprises a kinematic chain 500 for winding the movement 700. This kinematic chain comprises a pinion 55 which is mounted squarely on the first rod 5, which is in engagement with a first crown wheel 56. This first crown wheel 56 is capable of moving into engagement with a second crown wheel 57 in accordance with the state of a vertical coupling device which is controlled by the movement of the first rod 5 in the direction D.

This coupling device is comparable with the one described in the patent application WO2012175595. In particular, it comprises a third rod 58 which is arranged perpendicularly to the first rod 5 or substantially perpendicularly to the first rod 5 which is fixedly joined to a second crown wheel 57. The first rod 5 controls the third rod 58 by means of a groove 52 which is machined therein. In the first axial position P1 of the first rod 5, an end of the third rod 58 is located in the base of the groove 52 of the first rod 5 so that a Breguet tooth arrangement of the second crown wheel 57 is in engagement with a Breguet tooth arrangement of the first crown wheel 56 under the action of a return spring 96. In this manner, in the first axial position P1 of the first rod 5, the kinematic chain for winding the movement 700 is engaged. A movement of the rod 5 to the outer side of the movement 700, from the position P1 and in the direction D, raises the third rod 58 from the base of the groove 52 of the first rod 5 so that the Breguet tooth arrangement of the second crown wheel 57 is out of range of the Breguet tooth arrangement of the first crown wheel 56. In this manner, in the positions P2, P3 of the first rod 5, the kinematic chain for winding the movement 700 is disengaged.

The indexing device 100, in particular the lever/spring device 2, comprises:

an indexing member 4, and an indexing element 3 which comprises at least two sets of flanks 31*a*, 31*b*, 31*c*, 32*a*, 32*b* for defining indexing positions of the pull-out piece and which is mounted on the indexing member 4.

The indexing member 4 and the indexing element 3 are arranged or configured so as to define at least two positions, in particular at least two fixing positions, of the indexing element 3 on the indexing member 4. This is because the indexing element may be mounted on the indexing member:

in a first configuration or position for defining, after the indexing device has been integrated in the mechanism 600, a first set of indexed positions of the pull-out piece which correspond to a first set of indexed positions of the rod and/or a first set of indexed positions of the rocker, or in a second configuration or position for defining, after the indexing device has been integrated in the mechanism 600, a second set of indexed positions of the pull-out piece which correspond to a second set of indexed positions of the rod and/or a second set of indexed positions of the rocker.

In these first and second configurations, the indexing member and the indexing element are preferably fixedly joined to each other or fixed to each other or completely connected to each other. The connection may also be a connection which retains some degrees of freedom between the indexing member and the indexing element as long as this/these degree(s) of freedom do(es) not impair the indexing function. For example, the indexing element may move freely perpendicularly to the plane P relative to the indexing member. The mechanical connection is produced during the assembly of the mechanism or the timepiece. This connection is preferably not disassembled during normal or conventional operating modes of the timepiece. This connection is preferably disassembled only during any potential after-sales service operation. In this manner, the indexing element is kinematically connected to the indexing member (in particular, the indexing element and indexing member are fixed to each other with regard to the rotation movements about axes perpendicular to the plane P and translation movements along axes parallel with the plane P) during the handling of the first rod, in particular during the movement of the first rod in the direction D.

In the embodiment of the mechanism 600 described below, the lever/spring device 2 comprises the indexing member 4 and the indexing element 3. The indexing member 4 is a lever/spring member 4. This member is constituted by a first rigid portion 41, a first end of which is articulated along an axis A41 to the frame 99. The lever/spring member also comprises a second elastic portion 42, a first end of which is articulated along an axis A42 to the frame 99. The first and second portions 41, 42 are connected to each other in the region of the second respective ends thereof. More specifically, the second portion 42 is in the form of a curved plate formed in the continuation of the first rigid portion 41. The lever/spring member is generally in the form of an open loop with the axes A41 and A42 arranged close to each other.

The second elastic portion 42 constitutes a return element which returns the indexing element and/or the indexing member into a configuration for cooperation with the pull-out piece 10.

The indexing element 3 is in this instance in the form of a plate or a cam which is fixed to the member 4, in particular to the first rigid portion 41 of the member 4 of the lever/spring device 2, in a position selected from at least two possible positions.

To this end, the indexing element 3 is preferably mounted so as to be able to be displaced on the indexing member 4, in particular mounted so as to be able to be displaced in rotation on the indexing member about an axis A. To this end, the indexing device advantageously comprises positioning elements 43, 33*a*, 33*b*, such as pins which cooperate with holes, in order to position, in particular fix, the indexing element 3 in a position selected from at least two positions relative to the indexing member 4.

To this end, a pin 43 which is fixedly joined to the first position 41 is provided to be inserted into a notch which is selected from the notches 33*a* and 33*b* of the cam 3 in order to index the cam 3 in position with respect to the member 4 of the spring lever, in particular the first portion 41 of the lever/spring member 4. Alternatively, the pin may of course be fixedly joined to the cam 3, whilst the notches may be formed on the lever/spring member 4.

In this manner, the lever/spring device 2 is in the form of an assembly which comprises a lever/spring member 4 and a cam 3 which is indexed and fixed to the member 4, in particular to the first rigid portion 41 of the member 4.

The cam 3 comprises a first functional surface 31 and a second functional surface 32, one or other of these two surfaces being provided to cooperate with a first finger 12 of the pull-out piece 10 in accordance with the position of the cam 3 on the lever/spring member 4.

The cooperation of the first notch 33*a* and the pin 43 enables a first position of the cam 3 to be defined on the lever/spring member 4. After the lever/spring device 2 has been assembled, the cam 3 is fixed rigidly to the portion 41 of the lever/spring member 4, for example, by means of a pin 44. Such an assembly of the lever/spring device 2 may be carried out upstream of the assembly of the movement 700, in particular of the mechanism 600. Alternatively, the cam 3 may simply be indexed angularly by the pin 43 on the member 4 of the lever/spring device 2 and delimited vertically by the member 4 and a movement-blank 99 of the movement 700. In this manner, the assembly of the cam 3 on the lever/spring member 4 may be carried out during the assembly of the movement 700, in particular the mechanism 600. The indexing element may also be driven in the indexing member 4.

In this first configuration of the lever/spring device 2, the first surface 31 of the cam 3 is capable of cooperating with the pull-out piece, for example, with the first finger 12 of the pull-out piece 10. This surface 31 comprises three flanks 31*a*, 31*b*, 31*c* which enable, in cooperation with the finger 12, three positions to be defined, in particular three angular, stable or indexed positions of the pull-out piece. These stable or indexed positions of the pull-out piece enable the definition of:

three different axial positions of the first rod 5, in this instance the positions P1, P2 and P3 of the first rod 5, which are stable or indexed positions, and/or three different angular positions of the rocker 6 which are stable or indexed positions.

Figure 5:
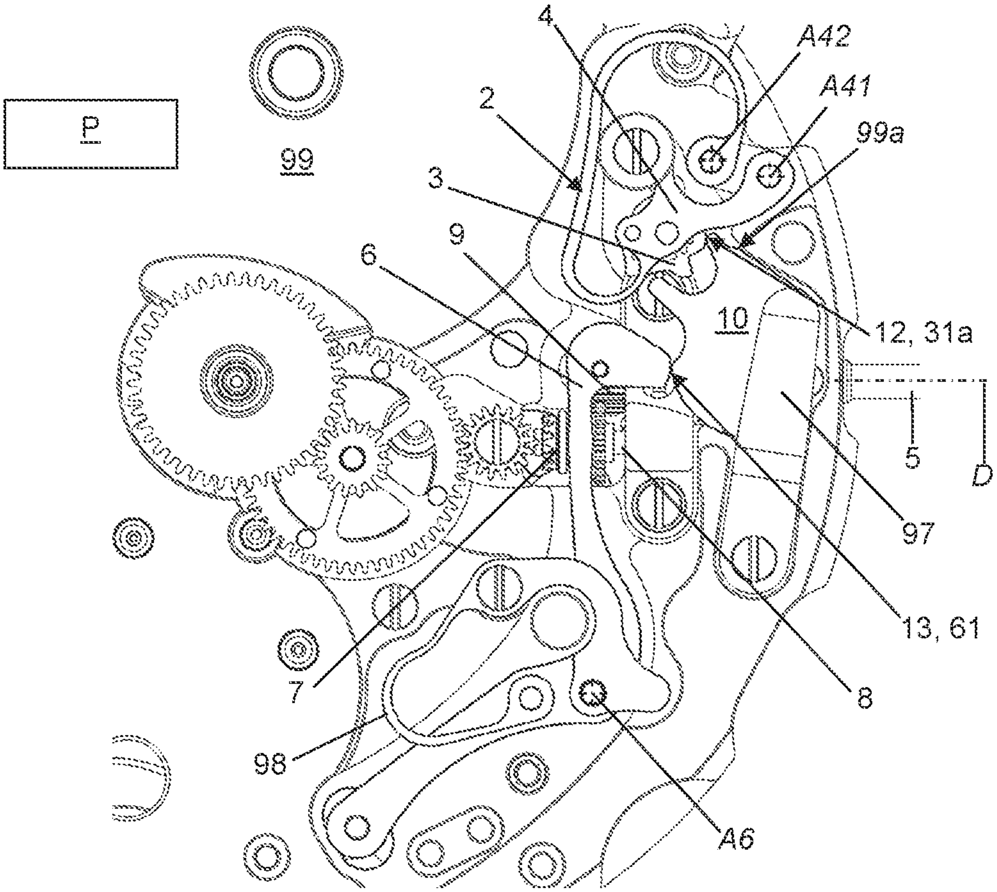
FIG. 5 is a partial plan view of the movement of the first embodiment of the timepiece, the pull-out piece indexing lever-spring device being in the first configuration and the pull-out piece being in a first position.

In a first position P1, the first flank 31*a* of the cam 3 is in abutment against the first finger 12 of the pull-out piece 10 under the action of the second elastic portion 42 of the lever/spring member 4, which brings about the abutment of the pull-out piece 10 against an abutment surface 99*a* of a movement-blank 99 of the mechanism 600, as illustrated in FIG. 5. In this first position P1, the tooth arrangements 72, 73 of the sliding pinion 7 are out of range of the wheels involved in the various control chains of the mechanism, as a result of the positioning of the rocker 6, one end 61 of which is in abutment with a stop surface 13 of the pull-out piece under the action of the spring 98. Furthermore, in this first position P1, the winding chain 500 is coupled.

Figure 6:
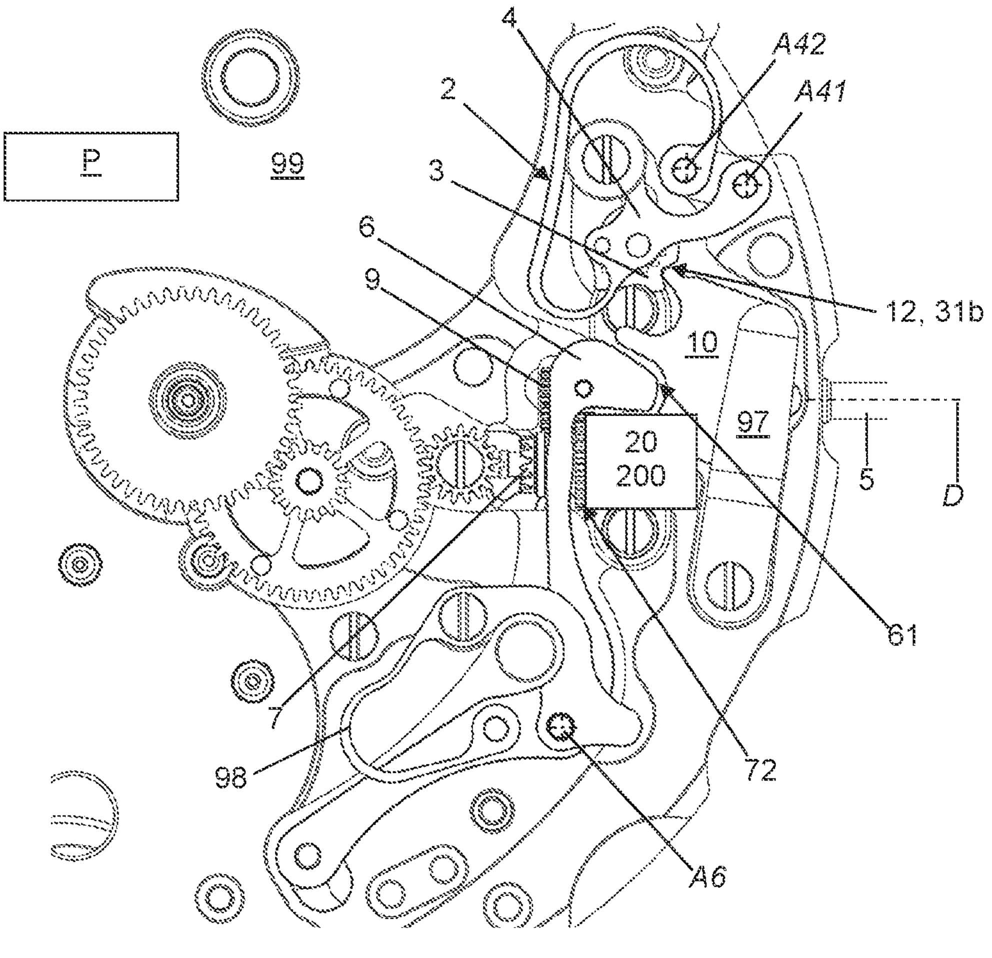
FIG. 6 is a partial plan view of the movement of the first embodiment of the timepiece, the pull-out piece indexing lever/spring device being in the first configuration and the pull-out piece being in a second position.

A traction of the first rod 5 toward the outer side of the movement 700 from the position P1 in the direction D brings about a rotation of the pull-out piece 10 in a counter-clockwise direction. The first finger 12 then acts counter to the first surface 31 of the cam 3, and therefore counter to the lever/spring member 4, until it is positioned in a recess formed by the second flank 31*b*, as illustrated in FIG. 6. In this second position P2, the rocker 6 has pivoted toward the outer side of the movement 700 (in a counter-clockwise direction) under the action of the spring 98 so that the edge tooth arrangement 72 of the sliding pinon 7 can engage with a tooth arrangement of a wheel 20 of a first control chain 200 of a time indication or time derivative, in particular a calendar indication such as a date indication. In this second position P2, the end 61 of the rocker has lost contact with the pull-out piece 10. Furthermore, the winding chain 500 is disengaged.

Figure 7:
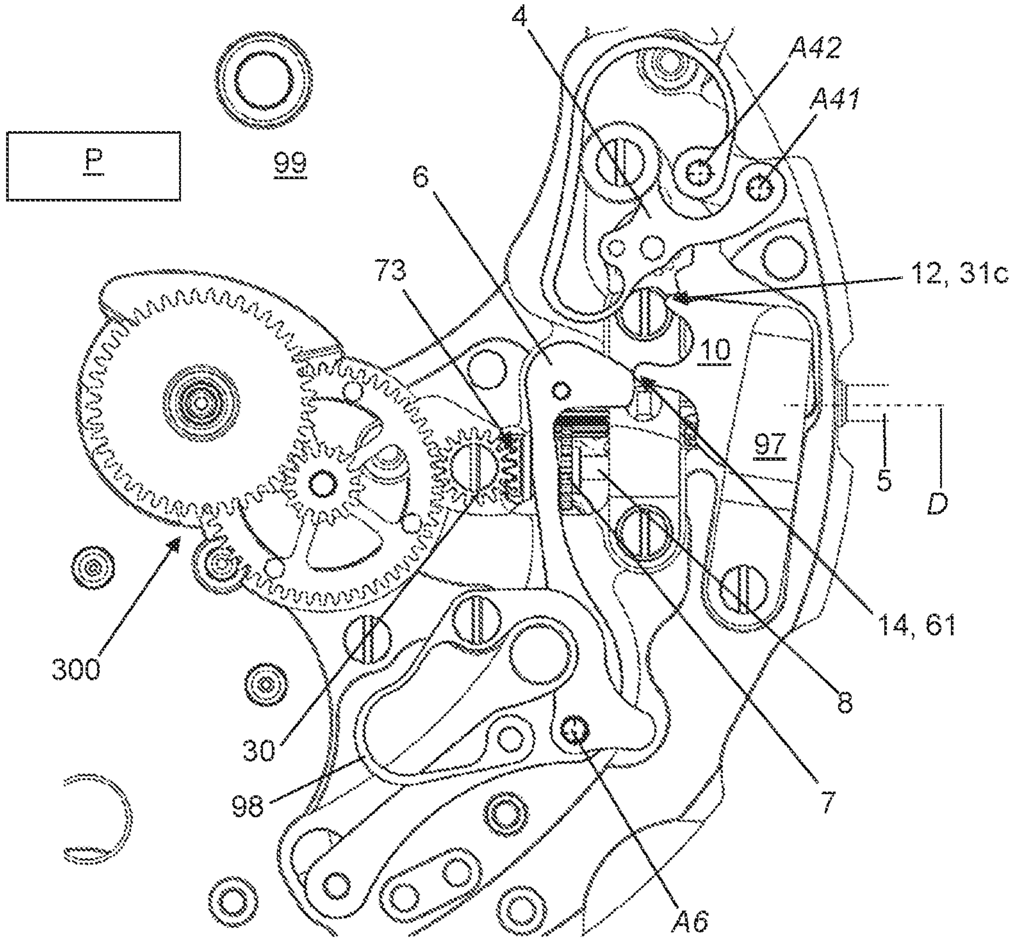
FIG. 7 is a partial plan view of the movement of the first embodiment of the timepiece, the pull-out piece indexing lever/spring device being in the first configuration and the pull-out piece being in a third position.

Another traction of the first rod 5 toward the outer side of the movement 700 from the position P2 in the direction D again brings about a rotation of the pull-out piece 10 in a counter-clockwise direction. The first finger 12 acts counter to the first surface 31 of the cam 3, and therefore counter to the lever/spring member 4, until it is positioned against the third flank 31*c*, as illustrated in FIG. 7. During the rotation thereof, the pull-out piece acts on the end 61 of the rocker 6 by means of a second finger 14 in order to drive it toward the inner side of the movement 700 (in a counter-clockwise direction) counter to the spring 98 so that the front tooth arrangement 73 of the sliding pinion 7 engages with a pinion 30 of a second control chain 300 of a time indication, or time derivative, in particular for setting the time of the movement 700.

The cooperation of the second notch 33*b* and the pin 43 enables a second position of the cam 3 to be defined on the member 4 of the lever/spring device 2.

In this second configuration of the lever/spring device 2, the second surface 32 of the cam 3 is capable of cooperating with the pull-out piece 10, in particular with the first finger 12 of the pull-out piece 10. This surface 32 comprises two flanks 32*a*, 32*b* which enable two different axial positions of the first rod 5 to be defined, in this instance the positions P1 and P3 of the first rod 5. These positions P1 and P3 of the first rod 5 are, for example, identical to those set out above.

Figure 8:
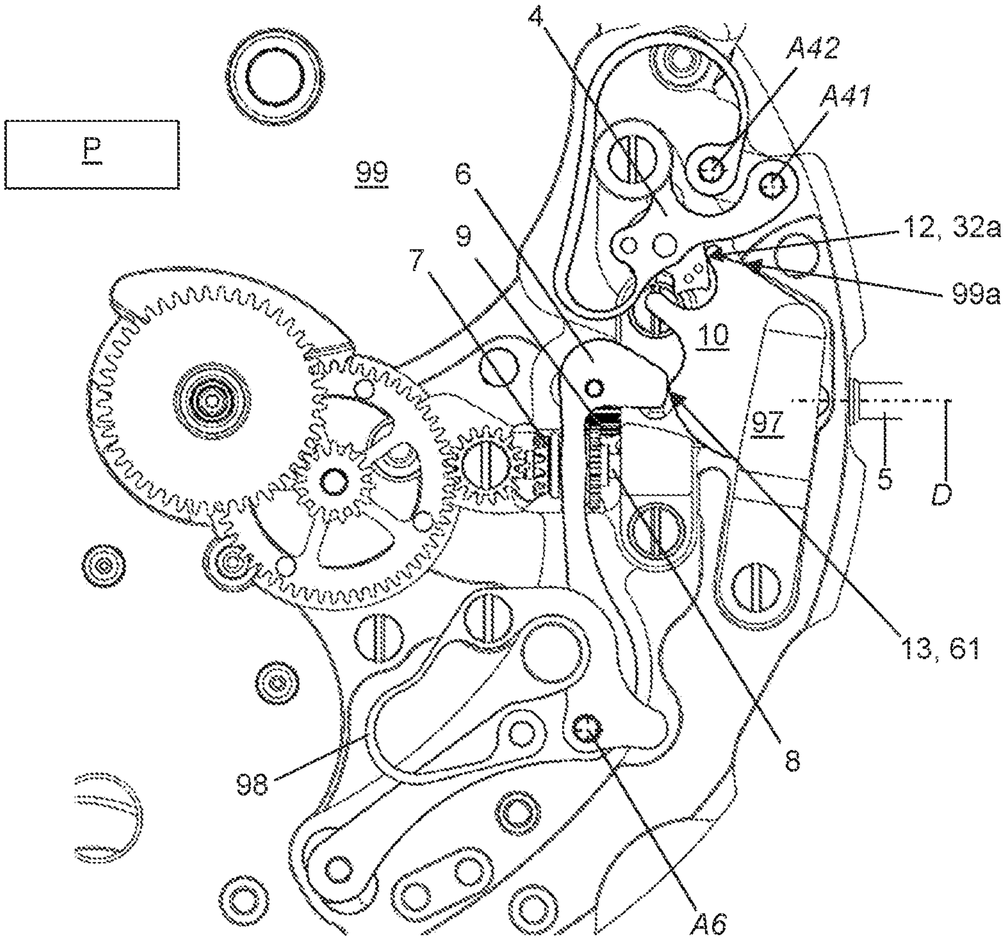
FIG. 8 is a partial plan view of the movement of the first embodiment of the timepiece, the pull-out piece indexing lever/spring device being in the second configuration and the pull-out piece being in a first position.

In the first position P1, the first flank 32*a* of the cam 3 is in abutment with the first finger 12 of the pull-out piece 10 under the action of the second elastic portion 42 of the lever/spring member 4, which brings about the abutment of the pull-out piece 10 against a stop surface 99*a* of a movement-blank 99 of the mechanism 600, as illustrated in FIG. 8. In this first position P1, the tooth arrangements 72, 73 of the sliding pinon 7 are out of range of the wheels which are involved in the various control chains of the mechanism as a result of the positioning of the rocker 6, the end 61 of which is in abutment against a stop surface 13 of the pull-out piece under the action of the spring 98. Furthermore, in this first position P1, the winding chain 500 is engaged.

Figure 9:
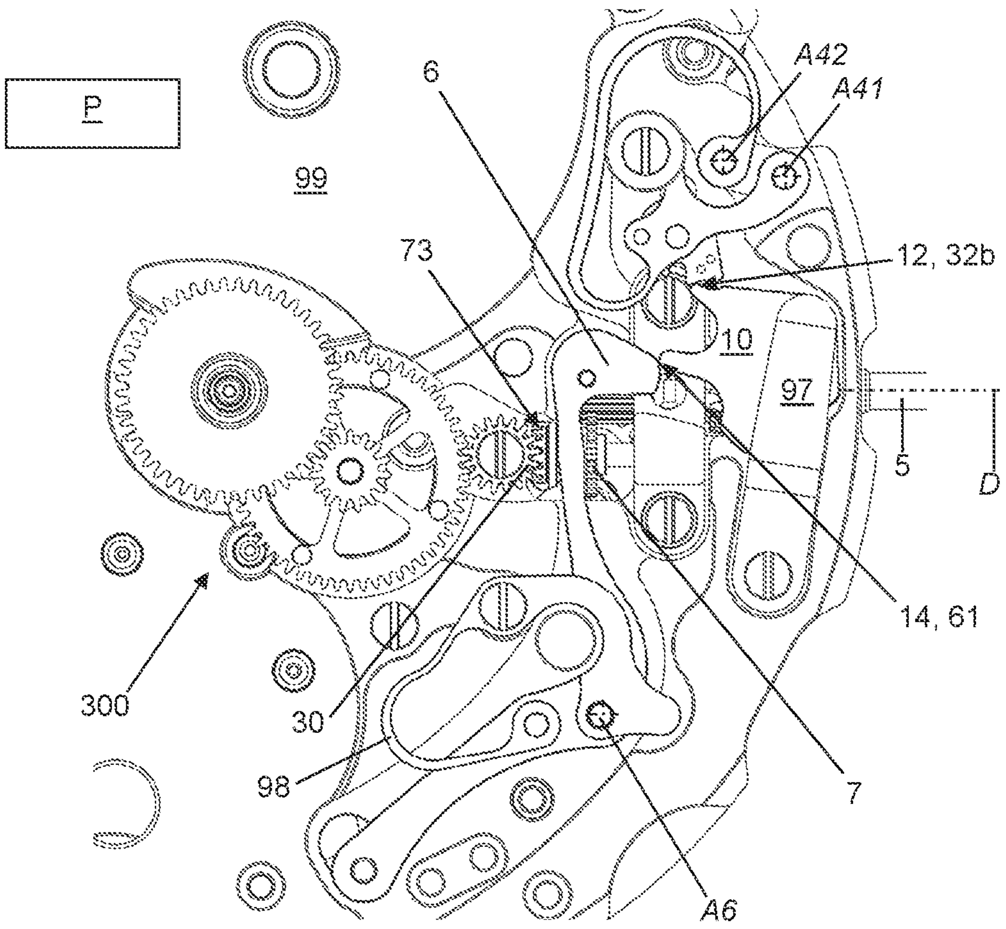
FIG. 9 is a partial plan view of the movement of the first embodiment of the timepiece, the pull-out piece indexing lever/spring device being in the second configuration and the pull-out piece being in a second position.
Figure 10:
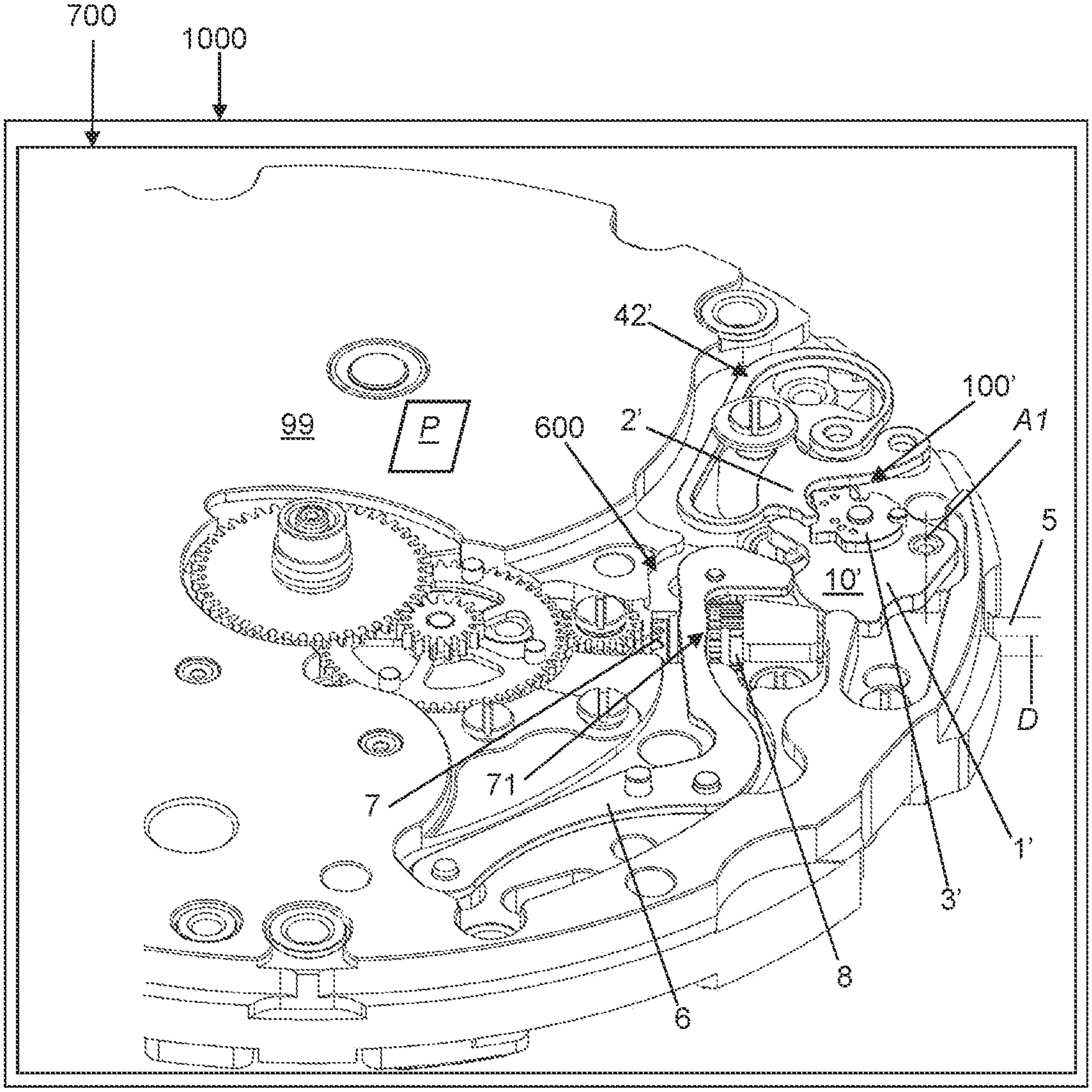
FIG. 10 is a perspective view of a second embodiment of a timepiece.
Figure 11:
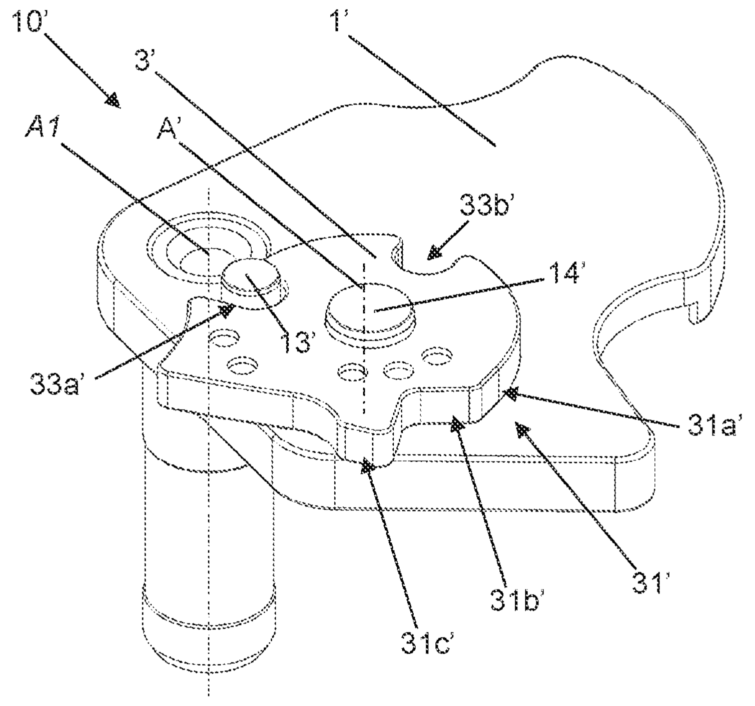
FIG. 11 is a perspective view of a pull-out piece device in a first configuration.
Figure 12:
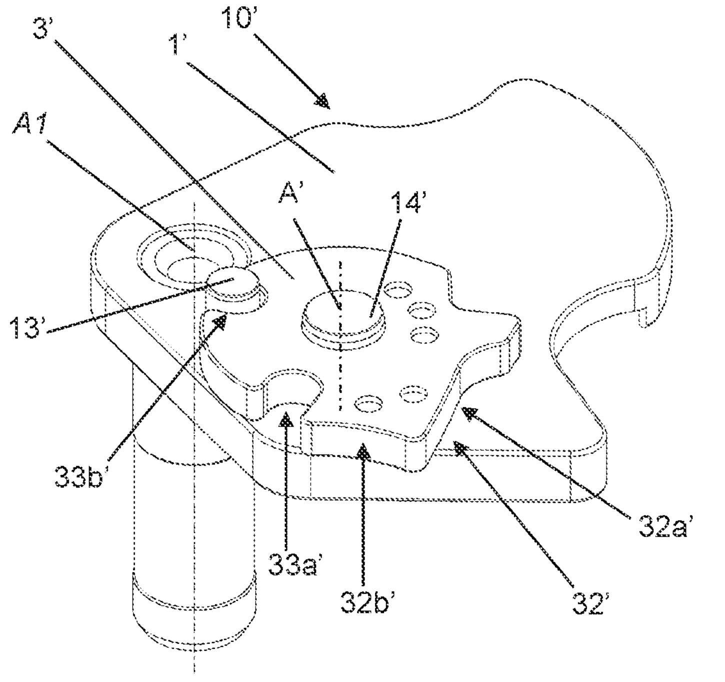
FIG. 12 is a perspective view of a pull-out piece device in a second configuration.
Figure 13:
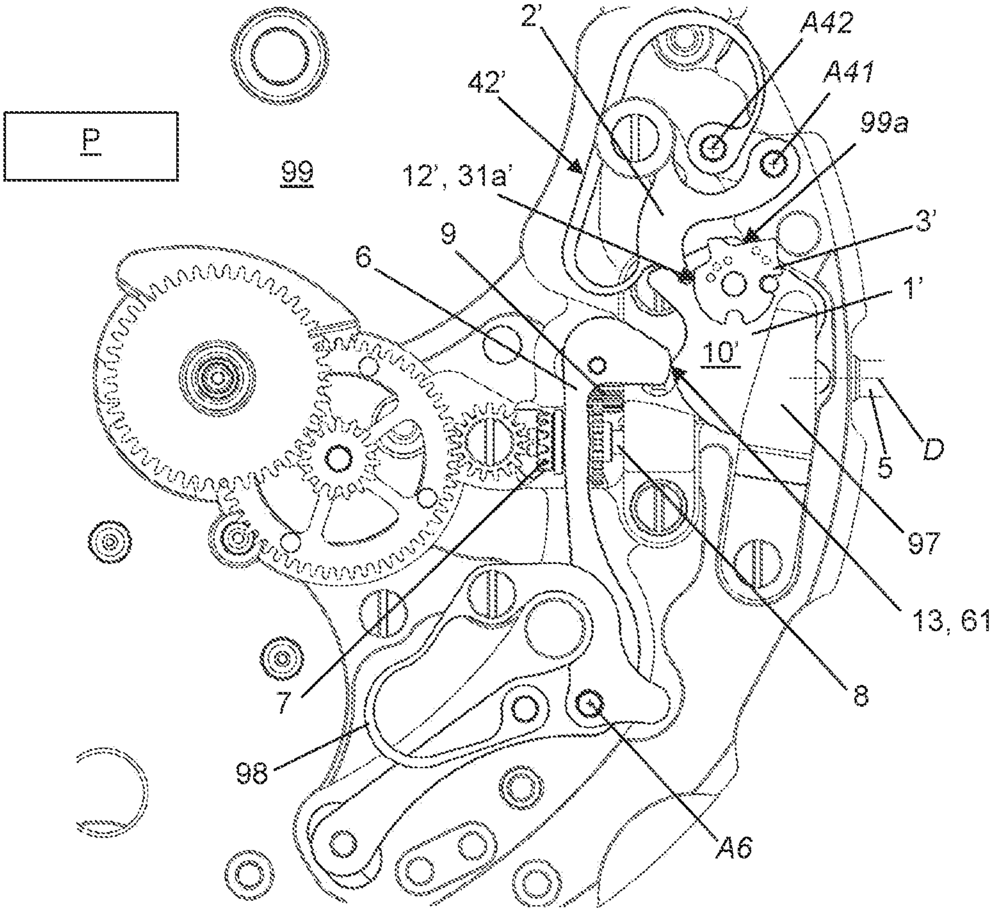
FIG. 13 is a partial plan view of the movement of the second embodiment of the timepiece, the pull-out piece device being in the first configuration and in a first position.
Figure 14:
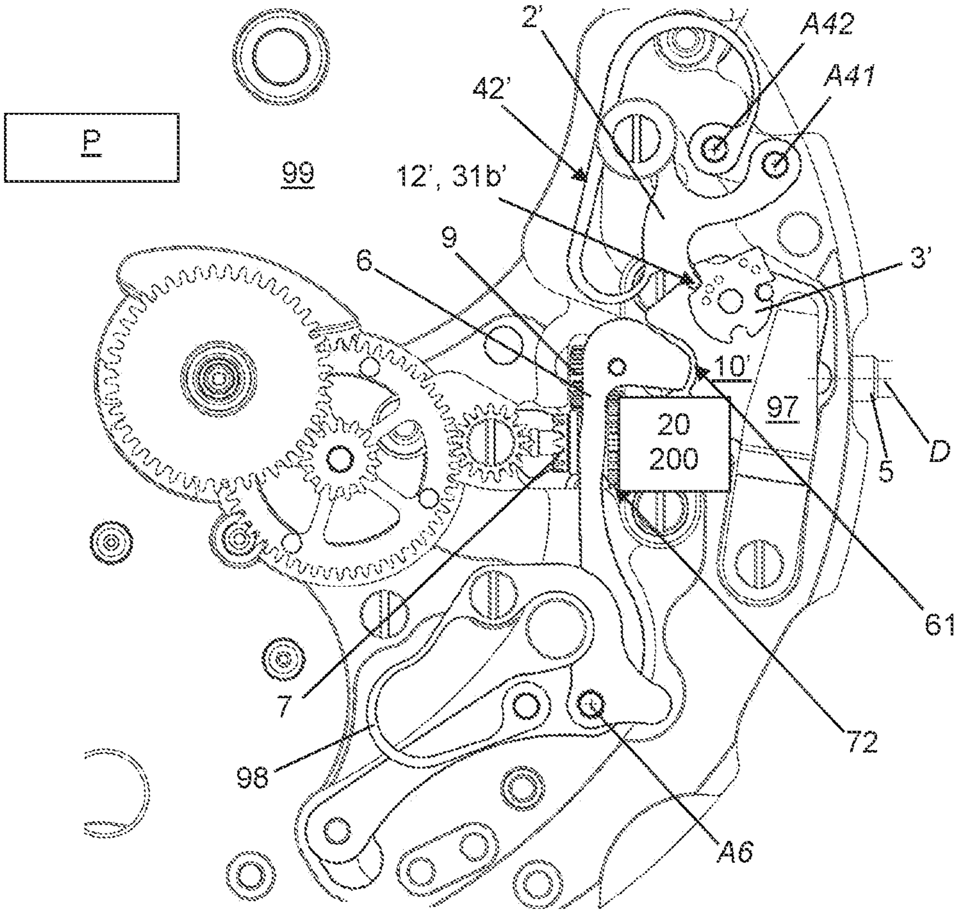
FIG. 14 is a partial plan view of the movement of the second embodiment of the timepiece, the pull-out piece device being in the first configuration and in a second position.
Figure 15:
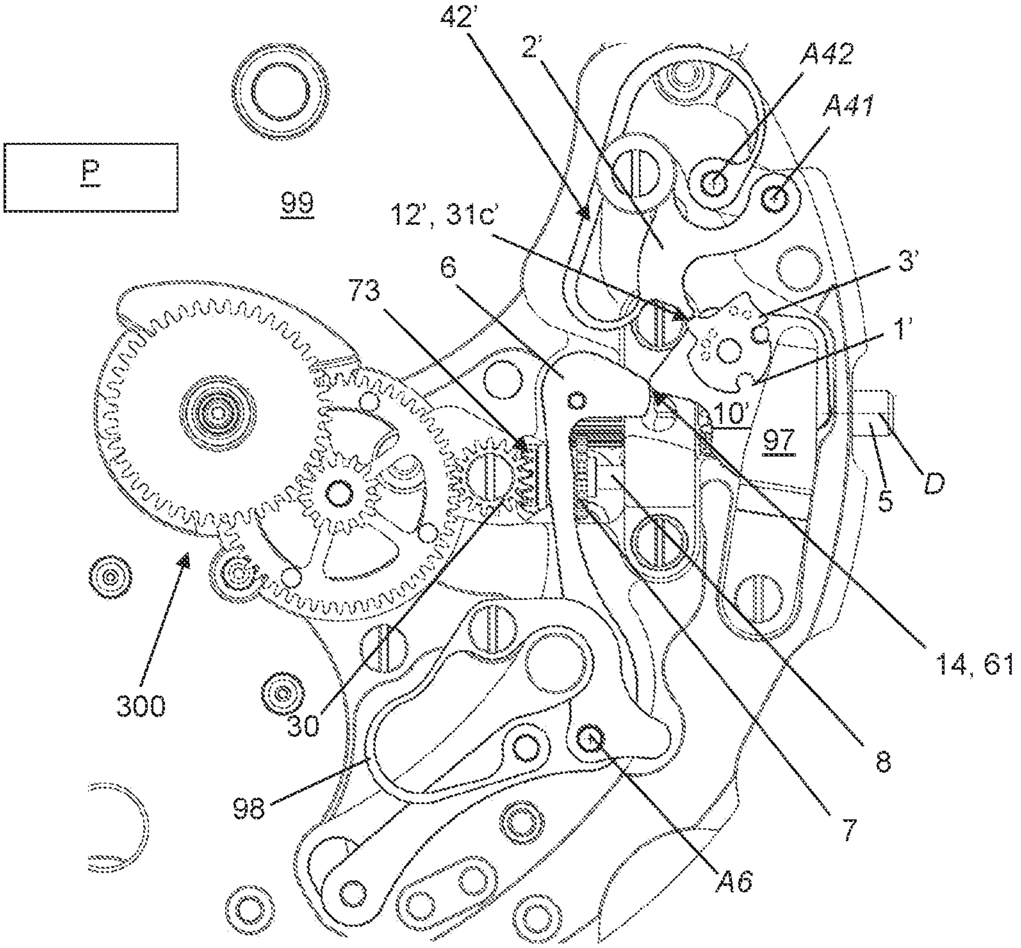
FIG. 15 is a partial plan view of the movement of the second embodiment of the timepiece, the pull-out piece device being in the first configuration and in a third position.
Figure 16:
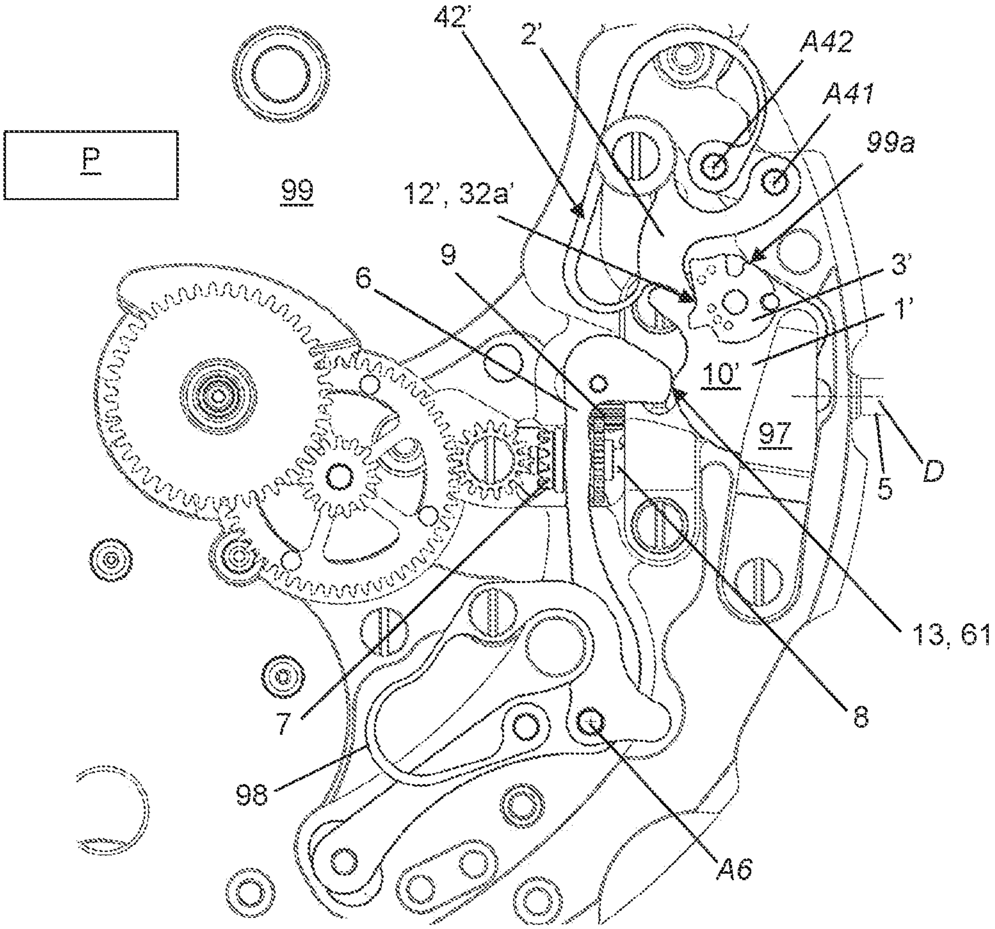
FIG. 16 is a partial plan view of the movement of the second embodiment of the timepiece, the pull-out piece device being in the second configuration and in a first position.
Figure 17:
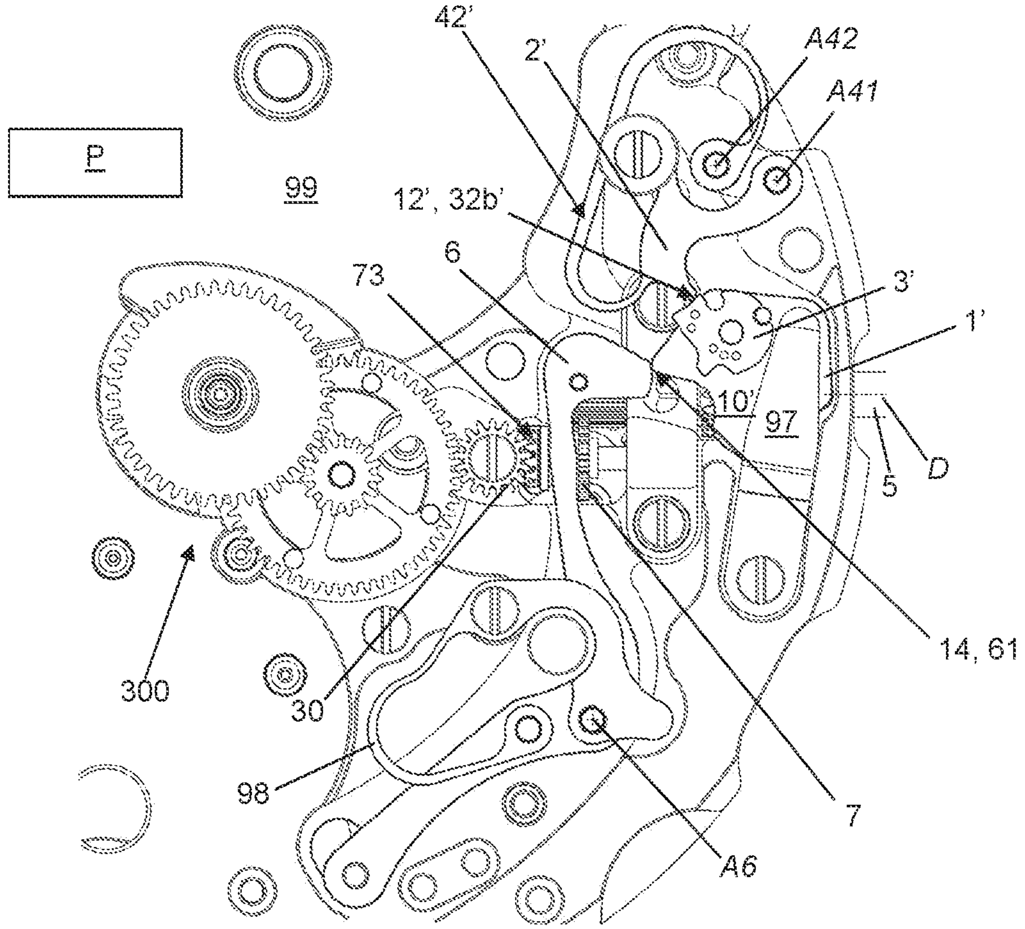
FIG. 17 is a partial plan view of the movement of the first embodiment of the timepiece, the pull-out piece device being in the second configuration and in a second position.

A traction of the first rod 5 toward the outer side of the movement 700 from the position P1, in the direction D, brings about a rotation of the pull-out piece in a counter-clockwise direction. The first finger 12 thus acts against the second surface 32 of the cam 3 and therefore against the lever/spring member 4, until it is positioned against the second flank 32*b*, as illustrated in FIG. 9.

During the rotation thereof, the pull-out piece acts on the end 61 of the rocker 6 by means of the second finger 14 in order to drive it toward the inner side of the movement 700, counter to the spring 98, so that the front tooth arrangement 73 of the sliding pinion 7 engages with a pinion 30 of a second control chain 300 of a time indication or time derivative, in particular for setting the time of the movement 700.

The angular amplitude travelled by the pull-out piece 10 between the positions P1 and P3 of the rod, when the lever/spring device 2 is located in this second configuration, corresponds in this instance to the sum of the angular amplitudes travelled by the pull-out piece between the positions P1 and P2, and between the positions P2 and P3, when the lever/spring device 2 is in the first configuration. In a similar manner, the amplitude of the movement travelled by the first rod 5 between the positions P1 and P3, when the lever/spring device 2 is located in this second configuration, corresponds in this instance to the sum of the amplitudes of the movements travelled by the first rod 5 between the positions P1 and P2 and between the positions P2 and P3 when the lever/spring device 2 is located in the first configuration.

As seen above, a first configuration or position of the indexing element on the indexing member enables three pull-out piece positions to be defined relative to a frame 99 and a second configuration or position of the indexing element on the indexing member enables two pull-out piece positions to be defined relative to the frame 99.

In a variant of this first embodiment which is not illustrated, the lever/spring device may be replaced by an assembly comprising a lever device and return element, the lever device and the return element being produced as two separate components and the return element returning the lever device against the pull-out piece. In this instance, the lever device comprises:

an indexing member formed by an actual lever, and an indexing element which comprises at least two sets of flanks for defining indexing positions of the pull-out piece and which is mounted on the indexing member.

A second embodiment of a timepiece 1000 is described below with reference to FIGS. 10 to 17.

The timepiece 1000 is, for example, a watch, in particular a wristwatch.

The timepiece 1000 comprises a watch movement 700 which is intended to be mounted in a case of the timepiece in order to protect it from the external environment.

The watch movement 700 may be an electronic movement or a mechanical movement, in particular an automatic movement.

The clock movement 700 comprises a clock mechanism 600. In particular, the clock mechanism may be a mechanism which uses a pull-out piece device. The clock mechanism comprises a pull-out piece indexing device 100' and a frame 99, The term "indexing a pull-out piece device" is intended to be understood to refer to the definition of various stable positions of the pull-out piece device. These stable positions are separated by a continuum of unstable intermediate positions. The user passes, via a mechanical action, in particular a mechanical action on a rod, the pull-out piece device from one stable position to another, via a continuum of unstable intermediate positions. Between two stable positions or two indexed positions or two indexing positions, the pull-out piece device passes transiently via a continuum of unstable intermediate positions.

In the second embodiment, the indexing device 100' comprises a pull-out piece device 10'. The pull-out piece indexing device preferably also comprises a lever and a return element, such as a spring. The return element and the lever may be constituted by a spring lever 2' which comprises a return element 42', as illustrated in FIGS. 10 and 13 to 17.

The indexing device, in particular the pull-out piece device, comprises:

an indexing member 1' and an indexing element 3' which comprises at least two sets of flanks 31*a*', 31*b*', 31*c*', 32*a*', 32*b*' for defining indexing positions of a pull-out piece and which is mounted on the indexing member 1'.

Preferably, the second embodiment of the timepiece differs from the first embodiment of the timepiece only in terms of the location of the indexing element and the indexing member. In the first embodiment, the indexing element is mounted on a lever or a spring lever which constitutes the indexing member and the indexing element cooperates with a finger which is provided on the pull-out piece. In the second embodiment of the timepiece, the situation is reversed, that is to say that the indexing element is mounted on the member 1' of a pull-out piece device 10', the member 1' constituting the indexing member, and the indexing element cooperates with a finger which is provided on the lever or on the spring lever.

The indexing member 1' of the pull-out piece 10' and the indexing element 3' are arranged or configured in order to define at least two positions, in particular at least two fixing positions, of the indexing element 3' on the indexing member 1'. This is because the indexing element may be mounted on the indexing member:

in a first configuration or position, in order to define, after the indexing device has been integrated in the mechanism 600, a first set of indexed positions of the pull-out piece device which correspond to a first set of indexed positions of the rod and/or a first set of indexed positions of the rocker, or, in a second configuration or position, in order to define, after the indexing device has been integrated in the mechanism 600, a second set of indexed positions of the pull-out piece device which correspond to a second set of indexed positions of the rod and/or a second set of indexed positions of the rocker.

In these first and second configurations, the indexing member and the indexing element are preferably fixedly joined to each other or fixed to each other or completely connected to each other. The connection may also be a connection which retains some degrees of freedom between the indexing member and the indexing element as long as this/these degree(s) of freedom do/does not impair the indexing function. For example, the indexing element may move freely perpendicularly to the plane P relative to the indexing member. The mechanical connection is produced during the assembly of the mechanism or the timepiece. This connection is preferably not disassembled during the normal or conventional modes of use of the timepiece. This connection is preferably disassembled only during a potential after-sales service operation if necessary. In this manner, the indexing element is kinematically connected to the indexing member or the pull-out piece member (in particular, the indexing element and the indexing member are fixed to each other with regard to the rotation movements about axes perpendicular to the plane P and translation movements along axes parallel with the plane P) during the handling of the first rod, in particular during the movement of the first rod in the direction D.

In the embodiment of the mechanism 600 described below, the pull-out piece device 10' acting as a pull-out piece comprises the indexing member 1' and the indexing means 3'. The indexing member 1' is a member 1' of the pull-out piece device. This member 1' of the pull-out piece device 10' (or the pull-out piece member 1') is articulated along an axis A1 to the frame 99.

The indexing element 3' is in this instance in the form of a plate or a cam which is fixed to the member 1' in a position selected from at least two possible positions.

To this end, the indexing element 3' is preferably mounted so as to be able to be displaced on the indexing member 1', in particular mounted so as to be able to be displaced in rotation on the indexing member about an axis A'. To this end, the indexing device advantageously comprises positioning elements 13', **33*a*', 33*b*', such as pins which cooperate with holes, in order to position, in particular fix, the indexing element 3' in a position selected from at least two positions relative to the indexing member 1'**.

For example, a pin 13' which is fixedly joined to the member 1' is provided to be inserted into a notch selected from the notches **33*a*' and 33*b*' of the cam 3' in order to index the cam 3' in position with respect to the member 1'. Alternatively, the pin may of course be fixedly joined to the cam 3' whilst the notches may be formed on the member 1'**.

In this manner, the pull-out piece device 10' may be in the form of an assembly comprising a pull-out piece member 1' and a cam 3' which is indexed and fixed to the pull-out piece member 1'.

The cam 3' comprises a first functional surface 31' and a second functional surface 32', one or other of these two surfaces being provided to cooperate with a first finger 12' of the lever or the spring lever 2' in accordance with the position of the cam 3' on the pull-out piece member 1'.

The cooperation of the first notch **33*a*' and the pin 13' enables a first position of the cam 3' to be defined on the pull-out piece member 1'. After the pull-out piece device 10' has been assembled, the cam 3' is fixed rigidly to the member 1', for example, by means of a pin 14'. Such an assembly of the pull-out piece device may be carried out upstream of the assembly of the movement 700, in particular the mechanism 600. Alternatively, the cam 3' may be simply indexed angularly by the pin 13' on the member 1' and delimited vertically by the member 1' and a movement-blank 99 of the movement 700. In this manner, the assembly of the cam 3' on the member 1' may be carried out during the assembly of the movement 700, in particular the mechanism 600. The indexing element 3' may also be driven in the pull-out piece member 1'**.

In a first configuration of the pull-out piece device 10', the first surface 31' of the cam 3' is capable of cooperating with the lever 2', for example, with the finger 12' of the lever. This surface 31' comprises three flanks **31*a*', 31*b*', 31*c*' which enable, in cooperation with the finger 12', three stable or indexed angular positions of the pull-out piece device 10' to be defined. These stable or indexed angular positions of the pull-out piece device 10'** enable the definition of:

- three different axial positions of the first rod 5, in this instance the positions P1, P2 and P3 of the first rod 5, which are stable or indexed positions, and/or
- three different angular positions of the rocker 6 which are stable or indexed positions.

The cooperation of the second notch **33*b*' and the pin 13' enables a second position of the cam 3' on the pull-out piece member 1'** to be defined.

In this second configuration of the pull-out piece device 10', the second surface 32' of the cam 3' is capable of cooperating with the lever 2', in particular with the first finger 12' of the lever 2'. This surface 32' comprises two flanks **32*a*', 32*b*' which enable two different axial positions of the first rod 5 to be defined, in this instance the positions P1 and P3 of the first rod 5. These positions P1 and P3 of the first rod 5** are, for example, identical to those set out above.

As set out above, a first configuration or position of the indexing element on the indexing member enables three pull-out piece positions to be defined relative to a frame 99 and a second configuration or position of the indexing element on the indexing member enables two pull-out piece positions to be defined relative to the frame 99.

In this second embodiment, the indexing device comprises a return element which is constituted, for example, by a spring or by a spring portion 42' of the spring lever 2', the return element returning the indexing element 3' into a configuration of cooperation with the spring lever 2'.

In the embodiments described, the indexing element is fixed or attached to the member of a pull-out piece or to the member of a lever or to the member of a spring lever. In an alternative embodiment of the pull-out piece indexing device, the indexing element may be indexed or fixed or attached to an intermediate element which is arranged at the interface of a lever or spring lever and a pull-out piece.

Of course, according to the embodiment of the pull-out piece device, the spring lever may more simply be in the form of a spring. The pull-out piece fingers may also be replaced by pins, if necessary.

In the embodiments and variants described above, the positions P1 correspond to a position for winding the movement 700. Alternatively, regardless of the embodiments and variants, the various positions P1 could correspond to different clock functions.

In the embodiments and variants described, depending on the configuration of the indexing element, the indexing device enables two or three indexing positions of a pull-out piece to be produced. Of course, such an indexing device may be modified in order to enable more than two configurations of the indexing element on the indexing member. For example, the indexing element may have three surfaces or more, which enables the same number of sets of indexing positions of a pull-out piece to be defined. In the same manner, each surface may define one or two or three or four indexing positions (or more). Furthermore, a first surface may define n first indexing positions and a second surface may define n second indexing positions, the first and second indexing positions being different from each other or one of the first positions being different from any of the two positions, with n being a natural whole number. Finally, a first surface may define n first indexing positions and a second surface may define m second indexing positions, with n and m being natural whole numbers and n being different from m.

Regardless of the embodiment or variant, the indexing element 3; 3' may be delimited by the indexing member 4; 1', on the one hand, and by the frame 99, on the other hand. Alternatively, regardless of the embodiment or the variant the indexing element 3' may be mounted so as to be completely connected to the indexing member 4; 1'. For example, the indexing element may be driven in the indexing member.

Preferably, regardless of the embodiment or the variant:

- a first indexed pull-out piece position enables the clock movement to be wound, that is to say, the first indexed pull-out piece position defines configurations and arrangements of components of the movement which connect the first rod to a winding chain of the movement,
- a second indexed pull-out piece position enables a correction, in particular a rapid correction, of a time derivative function of the clock movement, that is to say that the second indexed pull-out piece position defines configurations and arrangements of components of the movement which connect the first rod to a correction chain of a time derivative function of the clock movement, and
- a third indexed pull-out piece position enables the time of the clock movement to be set, that is to say that the third indexed pull-out piece position defines configurations and arrangements of components of the movement which connect the first rod to a time setting chain of the clock movement.

Preferably, the first pull-out piece position corresponds to a position of the first rod in which the rod is pressed furthest into the movement. The second pull-out piece position corresponds to the first stable indexed position of the first rod which is encountered when a traction force is applied to the first rod when it is located in a first position. The third pull-out piece position corresponds to the first stable indexed position of the first rod which is encountered when a traction force is applied to the first rod when it is located in the second position.

The invention further relates to a method for assembling a pull-out piece indexing device 100, 100' as described above or a method for assembling a mechanism 600 as described above or a method for assembling a movement 700 as described above or a method for assembling a timepiece as described above.

The method comprises the following steps:

- a step of providing the indexing member 4; 1',
- a step of providing the indexing element 3; 3',
- a step of assembling the indexing element 3; 3' on the indexing member 4; 1':
- in a first position or
- in a second position.

Of course, if the indexing element has more than two surfaces, the indexing element may alternatively be mounted on the indexing member in a third position.

As a result of the solutions described above, a pull-out piece indexing element may be selected and configured upstream of the assembly of the timepiece movement so that the pull-out piece device can position the rod of the mechanism with which it is involved in particular in two or three positions. As a result of these solutions, in which a pull-out piece indexing element may be selected and configured upstream of the assembly of the timepiece movement, the risk of a watchmaker being able to make an assembly error during the assembly of the movement in which the mechanism is involved or during a restoration operation is eliminated.

The solutions described above will advantageously be implemented when the construction of the timepiece movements involves constituting families of calibers in order to use to the greatest possible extent the same components or assemblies for movements whose final presentation is adjusted by the addition of elements specific to the desired level of complexity. In this manner, by way of example, a calendar movement and a time zone movement of the same family will be able to share the same basic movement and a pull-out piece indexing device having the same components, these components, in particular the indexing element, being simply configured differently to define the indexing positions of a pull-out piece which are adapted to the two movements. In this manner, a pull-out piece indexing device having the same components can be fitted to movements or timepieces which are very different.

In particular, the solutions described enable a pull-out piece device to be produced which is very configurable and which enables in particular a mechanism to be implemented with two or three positions, depending on the number of functions to be corrected. These solutions enable the number of components and assemblies common to the movements of the same family to be maximized.

In this entire document, the term "indexing member" is preferably intended to be understood to refer to a member which supports an indexing element, in particular a member which supports an indexing cam.

The invention claimed is:

1. A pull-out piece indexing device for a timepiece or for a clock movement, comprising:

- an indexing member, and
- an indexing element which comprises at least two sets of flanks for defining indexing positions of a pull-out piece and which is mounted on the indexing member,
- wherein the indexing member and the indexing element are arranged or configured so as to define at least two positions of the indexing element on the indexing member, wherein in each of the at least two positions, the indexing element and the indexing member are fixed to each other.

2. The pull-out piece indexing device as claimed in claim 1, wherein the indexing member is:

- a member of a lever device, or
- a member of a pull-out piece device.

3. The pull-out piece indexing device as claimed in claim 1, wherein the indexing device comprises a return element which returns the indexing element into a configuration for cooperation with a pull-out piece or with a lever.

4. The pull-out piece indexing device as claimed in claim 1, wherein the indexing element is mounted so as to be able to be displaced on the indexing member, the indexing device comprising positioning elements in order to position the indexing element in a position selected from the at least two positions relative to the indexing member.

5. The pull-out piece indexing device as claimed in claim 1, wherein a first position among the at least two positions of the indexing element on the indexing member enables two pull-out piece positions to be defined relative to a frame and wherein a second position among the at least two positions of the indexing element on the indexing member enables three pull-out piece positions to be defined relative to the frame.

6. The pull-out piece indexing device as claimed in claim 1, wherein a first indexed pull-out piece position defines a configuration for winding a clock movement, a second indexed pull-out piece position defines a configuration for correcting a time derivative function of a clock movement and a third indexed pull-out piece position defines a time setting configuration of a clock movement.

7. A clock mechanism comprising:

the pull-out piece indexing device as claimed in claim 1, and a frame.

8. The clock mechanism as claimed in claim 7, wherein the indexing element is delimited (i) by the indexing member and (ii) by the frame.

9. The clock mechanism as claimed in claim 7, wherein the indexing element is driven in the indexing member.

10. A clock movement comprising the clock mechanism as claimed in claim 7.

11. A timepiece comprising the clock movement as claimed in claim 10.

12. A method for assembling the pull-out piece indexing device as claimed in claim 1, wherein the method comprises:

providing the indexing member, providing the indexing element, mounting the indexing element on the indexing member in a first of the at least two positions or in a second of the at least two positions.

13. The pull-out piece indexing device as claimed in claim 1, which is selected from the group consisting of:

a lever device for a pull-out piece, a lever/spring device for the pull-out piece, a pull-out piece device.

14. The pull-out piece indexing device as claimed in claim 2, wherein the indexing member is a member of a lever/spring device.

15. The pull-out piece indexing device as claimed in claim 14, wherein the indexing member is in form of a loop.

16. The pull-out piece indexing device as claimed in claim 4, wherein the indexing element is mounted so as to be able to be displaced in rotation on the indexing member about an axis.

17. The pull-out piece indexing device as claimed in claim 4, wherein the positioning elements are pins which cooperate with holes, in order to fix the indexing element in the position selected from the at least two positions relative to the indexing member.

18. A clock movement comprising the pull-out piece indexing device as claimed in claim 1.

19. A timepiece comprising the pull-out piece indexing device as claimed in claim 1.

20. The pull-out piece indexing device as claimed in claim 1, wherein in each of the at least two positions, the indexing element and the indexing member are removably fixed to each other.

21. The pull-out piece indexing device as claimed in claim 4, wherein the indexing element is mounted so as to be able to be displaced in rotation on the indexing member about an axis, and wherein the positioning elements are pins which cooperate with holes, so as to fix the indexing element to the indexing member in the position selected from the at least two positions relative to the indexing member.

* * * * *